United States Patent
Schweigert et al.

[19]

[11] Patent Number: 6,099,785
[45] Date of Patent: Aug. 8, 2000

[54] METHOD FOR INJECTION MOLDING PLASTIC CLOSURES

[76] Inventors: Lothar Schweigert, P.O. Box 3765, Incline Village, Nev. 89450; Ui Hwan O, 934 Third Ave., Los Angeles, Calif. 90019

[21] Appl. No.: 09/042,699

[22] Filed: Mar. 17, 1998

[51] Int. Cl.[7] .................................................. B29C 45/44
[52] U.S. Cl. ........................ 264/328.1; 264/318; 264/334; 425/438; 425/577; 425/DIG. 58; 249/59
[58] Field of Search ....................... 425/577, 182, 425/190, DIG. 58, 438; 249/59; 264/318, 334, 328.1

[56] References Cited

U.S. PATENT DOCUMENTS

| | | |
|---|---|---|
| Re. 28,158 | 9/1974 | Uhlig . |
| 2,583,093 | 1/1952 | Emmert et al. . |
| 2,718,032 | 9/1955 | Harvey . |
| 3,125,801 | 3/1964 | Fields ........................................ 264/318 |
| 3,339,242 | 9/1967 | Lamb . |
| 3,344,942 | 10/1967 | Hedgewick . |
| 3,555,606 | 1/1971 | Hedgewick . |
| 3,586,196 | 6/1971 | Barton . |
| 3,612,325 | 10/1971 | Williams . |
| 3,618,170 | 11/1971 | Owens . |
| 3,865,529 | 2/1975 | Guzzo . |
| 3,905,740 | 9/1975 | Lovejoy . |
| 4,019,711 | 4/1977 | Altenhof et al. . |
| 4,046,282 | 9/1977 | Ruch . |
| 4,093,094 | 6/1978 | Smalley et al. . |
| 4,109,815 | 8/1978 | Collins, III . |
| 4,123,495 | 10/1978 | Abey ........................................ 264/318 |
| 4,378,893 | 4/1983 | Wilde et al. . |
| 4,381,840 | 5/1983 | Ostrowsky . |
| 4,383,819 | 5/1983 | Letica . |
| 4,407,422 | 10/1983 | Wilde et al. . |
| 4,462,502 | 7/1984 | Luenser et al. . |
| 4,497,765 | 2/1985 | Wilde et al. ............................. 264/268 |
| 4,502,660 | 3/1985 | Luther et al. . |
| 4,525,130 | 6/1985 | Netznik . |
| 4,533,312 | 8/1985 | Von Holdt ................................ 425/438 |
| 4,541,605 | 9/1985 | Kubota et al. ........................... 249/142 |
| 4,552,328 | 11/1985 | Dutt et al. ................................ 249/67 |
| 4,618,121 | 10/1986 | Conti . |
| 4,627,810 | 12/1986 | Von Holdt . |
| 4,629,083 | 12/1986 | Druitt . |
| 4,648,520 | 3/1987 | Stull . |
| 4,664,280 | 5/1987 | Whitney et al. . |
| 4,674,642 | 6/1987 | Towns et al. . |
| 4,676,732 | 6/1987 | Letica . |
| 4,708,632 | 11/1987 | Mitteregger et al. . |
| 4,731,014 | 3/1988 | Von Holdt . |
| 4,782,968 | 11/1988 | Hayes . |
| 4,806,301 | 2/1989 | Conti ........................................ 264/334 |
| 4,832,307 | 5/1989 | Watanabe et al. . |
| 4,854,849 | 8/1989 | Sudo . |

(List continued on next page.)

FOREIGN PATENT DOCUMENTS 1589051  5/1981  United Kingdom .

*Primary Examiner*—Jan H. Silbaugh
*Assistant Examiner*—Stefan Staicovici
*Attorney, Agent, or Firm*—Wood, Herron & Evans, L.L.P.

[57] ABSTRACT

An injection molding apparatus and method of injection molding a closure having projections extending inwardly from a skirt of the closure includes a plurality of slides for movement obliquely with respect to an inner mold core. A ring contacts the closure and surrounds the slides. Movement of the ring relative to the mold core results in the movement of the closure which moves the slides to disengage recesses on the slides. The recesses are used to form the projections on the closure. The ring contacts the closure and advances the closure away from the mold core. The projections seated within the recesses on the slides move the slides obliquely relative to the mold core and ultimately disengage the recesses from the projections thereby releasing the closure from the mold. The movement of the slides is independent from the movement of the ring so that complicated mechanisms for movement of the slides are not required according to this invention.

17 Claims, 4 Drawing Sheets

U.S. PATENT DOCUMENTS

| | | | |
|---|---|---|---|
| 4,881,891 | 11/1989 | Luther . | |
| 4,919,608 | 4/1990 | Catalanotti et al. | 425/556 |
| 5,053,182 | 10/1991 | Hedgewick . | |
| 5,064,084 | 11/1991 | McBride et al. . | |
| 5,137,442 | 8/1992 | Starkey . | |
| 5,230,856 | 7/1993 | Schellenbach | 264/328.1 |
| 5,232,718 | 8/1993 | Miyazawa et al. . | |
| 5,281,127 | 1/1994 | Ramsey . | |
| 5,281,385 | 1/1994 | Julian | 264/318 |
| 5,368,469 | 11/1994 | Ekkert | 425/556 |
| 5,383,780 | 1/1995 | McCready et al. . | |
| 5,403,179 | 4/1995 | Ramsey | 425/577 |
| 5,447,674 | 9/1995 | Schellenbach | 264/255 |
| 5,551,864 | 9/1996 | Buskovic . | |
| 5,603,968 | 2/1997 | Tajiri et al. . | |
| 5,609,894 | 3/1997 | Rathbun . | |
| 5,630,977 | 5/1997 | Catalanotti et al. | 264/318 |
| 5,925,303 | 7/1999 | Scheliga | 264/318 |

METHOD FOR INJECTION MOLDING PLASTIC CLOSURES

BACKGROUND OF THE INVENTION

This invention relates to the manufacture of closures such as caps and the like, and more particularly, to a method and apparatus for injection molding plastic closures.

The injection molding of small plastic articles of even relatively simple designs often utilizes expensive and complex molding machines as exemplified by molding systems used for small plastic articles such as threaded closures for plastic, glass or other containers and bottles. A typical injection molding machine employs forming elements which are subjected to elevated temperatures and pressures. The molding machine components subjected to such conditions must be extremely rugged, necessitating the utilization of durable and expensive materials which require appropriate maintenance, repair and replacement on a regular schedule.

In one known system for the injection molding of small plastic closures, an inner mold in combination with an outer mold defines a forming volume or cavity in which a thermoplastic resin such as polypropylene or the like is injected under pressure at an elevated temperature. The various mold components must be moved relative to one another to extract or eject the molded closure from the cavity.

The art of injection molding plastic closures is well known. Depending upon the design of the plastic closure, including the thread type or other mechanism for engaging the container, the closure may be ejected from the mold in a variety of ways. If the plastic material being molded is flexible or resilient, the closure may be stripped by a commonly known stripper ring pushing the article off of a fixed inner mold core. The molded part must be sufficiently solidified so as not to fold over onto itself during ejection but sufficiently elastic to return to essentially its original molded shape after the threads or other internal projections have been stretched over the core. If the molded material does not possess the appropriate characteristics of flexibility and rigidity for this method of ejection, the article will be damaged or may not return to its original shape and size. Moreover, a very defined or deep thread profile is inherently prone to stripping damage. Also, the closure often has other delicate or fragile features such as a tamper evident ring, which could be damaged even if an otherwise acceptable plastic is being injection molded.

Plastic closures can be manufactured with different features, such as continuous threads, partial or interrupted threads, or spaced hold-down lugs used commonly in child resistant safety bottles. Additionally, a closure may include a retaining rim which is used to secure a disk or insert adjacent the under surface of the upper panel of the closure. Threads, lugs or other projections from the skirt portion of the closure commonly include an undercut surface which is known to provide a more secure engagement with the threads or other mechanism on the container to which the closure is applied.

Although specialized molding systems have been proposed for the manufacture of closure caps having interrupted threads or lugs, particularly those with an undercut, such systems often include very complicated molding schemes. Commonly, a system for the manufacture of closures having interrupted threads, lugs or the like with an undercut surface includes what is usually referred to as a "collapsible" core. The collapsible core includes axially extending segments held together in an assembled configuration to form a portion of the inner mold. After the thermoplastic resin is injected into the cavity in the mold, these segments are advanced forwardly and collapsed radially inwardly towards the axis of the mold to permit each segment to clear the threads or lugs and permit ejection of the closure without interference. Subsequently, the segments are repositioned to form the inner mold and the cycle is repeated.

However, known collapsible cores of the type described are very expensive and the construction of such molds inherently limits the industrial applicability and reliability of such molds. The complicated and often intricate interaction between the various segments and components of the injection molding apparatus presents significant maintenance and reliability problems. The timing and precise interaction between the various components is critical for the proper operation of known systems. Moreover, the frictional interaction between the various moving components of an injection mold having a collapsible core presents additional reliability and maintenance problems.

Further complicating the industrial applicability of known injection molding systems is the difficulty of using such systems with stack molds in which a plurality of molding systems are mounted in adjacent plates. As the plates are shifted relative to one another, multiple closures are formed and ejected providing for the manufacture of thousands of closures from a single machine in a very short time frame. However, failure of one mold component necessitates service to the entire machine thereby sacrificing a significant amount of production capability while service is being performed.

Another problem with known injection molding systems of the type described is the difficulty in reconfiguring the molds for the production of a variety of different closure designs. Specifically, tamper evident closures are widely used to demonstrate to the final consumer that the contents of a container have not been contaminated subsequent to the time the cap was initially secured to the container. One type of tamper evident closure employs a band connected to a bottom edge of a skirt portion of the closure by a plurality of axially extending discrete, small frangible bridges or other members that are circumferentially spaced around the closure. The band includes an inside annular rib which, in use on the container, is located below a cooperating outwardly extending rib on the neck of the container. As the closure is twisted off of the container, contact between the outside rib on the container neck and the inside rib on the band breaks the previously mentioned frangible bridges, thereby separating the band from the remainder of the closure.

Providing a molded closure with a tamper evident band as described complicates the manufacture of the closure in several respects. The formation of the band and the frangible bridges connecting the band to the skirt of the closure requires that the mold used to form the closure have corresponding recesses and protrusions which complicate the removal of the closure from the mold. Naturally, the closure must be removed from the mold in a way that does not break the frangible bridges of the closure since, of course, otherwise the closure cannot be used in the intended manner. The capability for an industrial injection molding machine to satisfactorily mold a closure having such a tamper evident band to date has been suspect. Furthermore, the ability to re-configure a given molding machine for the production of closures without tamper evident bands to/from the production of closures with tamper evident bands often requires significant down time thereby minimizing production capacity and efficiency.

SUMMARY OF THE INVENTION

These and other disadvantages of known closure injection molding systems have been overcome by this invention. A presently preferred embodiment of this invention comprises a molding apparatus, a method of injection molding a closure and such a closure having a skirt depending downwardly from an upper panel and at least one projection extending inwardly from the skirt. The projection may be one or more intermittent or interrupted threads, lugs, stops, rims or bayonet-type engagement mechanisms for securing the closure to the upper rim of a compatible container, jar or the like.

In a presently preferred embodiment of a method for injection molding a closure, closure material such as a thermoplastic resin which is rigid, pliable, and flowable, for example styrene and polypropylene, is injected into a mold cavity formed between an outer mold and an inner mold. The outer mold includes a socket for forming the outer external surface of the closure. The inner mold includes a core and a plurality of spaced slides, each having at least one recess on an outer face thereof for forming the projection on the skirt of the closure. The slides are mounted for movement relative to the core in a direction obliquely oriented with respect to a longitudinal axis of the core to provide a collapsible inner mold.

In one embodiment, the recess on the slides includes an undercut surface to form a corresponding undercut surface on the projection, lug, thread, rim or the like of the closure. Additionally, a ring surrounds the inner mold and is mounted for movement generally parallel to the longitudinal axis of the inner mold. The injection molding method proceeds by removing the outer mold from the closure which is seated on the inner mold. In one preferred embodiment, the ring contacts the terminal edge of the skirt on the closure and the ring is mounted for movement independent from the slides on the inner mold. The closure is released from the inner mold by moving the ring in contact with the closure parallel to the longitudinal axis of the core and away from the core. The movement of the ring removes the closure off of the core and the movement of the closure translates the slides obliquely relative to the longitudinal axis of the core thereby collapsing the slides inwardly toward the longitudinal axis until the projections on the skirt of the closure disengage from the recesses on the slides. The movement of the slides to release the closure from the inner mold is advantageously a result of the interaction between the recesses and the projections on the closure and not the direct interaction between the ring and the slides. This method and the associated molding apparatus are more simplistic than known injection molding techniques. Without the closure seated on the inner mold, the forward movement of the ring would not result in the movement of the slides because the ring is separate and independently movable from the slides. The present design minimizes the number of moving parts of the molding apparatus thereby limiting the maintenance requirements for the mold.

A further advantage of the invention is the simplicity resulting from the reduced number of moving parts and the interchangeability of the various components. Specifically, the slides and/or the ring can be easily replaced independent from the other components of the molding apparatus. A standard ring is used for the formation of a closure without a tamper evident band; whereas, a tamper evident band forming ring is easily substituted for the standard ring when a closure having a tamper evident band is molded. Specifically, the tamper evident band forming ring includes an intaglio pattern on the ring which forms the tamper evident band on the closure. Specifically, the intaglio pattern includes relief portions for forming the tamper evident band and the frangible bridges connecting the band to the lower terminal edge of the skirt of the closure.

Additionally, a single plunger or a plurality of plungers each of which are selectively axially extendable from the core of the inner mold may be included in an alternative preferred embodiment of this invention to assist in dislodging the formed closure having a tamper evident band from the ring. Alternatively, the plunger(s) may be used to unseat the closure from the core by contacting the panel of the closure and moving the closure forwardly and thereby moving the slides obliquely and inwardly towards the longitudinal axis of the inner mold to release the recesses on the slides from the projections on the closure. The plunger may be used to advance the closure in this manner in place of and/or in addition to the movement of the ring surrounding the closure. The capability of simply swapping the tamper evident forming band ring with the standard ring without the requirement for making an entirely new molding apparatus is a key advantage for the industrial applicability of this invention.

It should be readily appreciated by those of ordinary skill in the art that an injection molding apparatus according to this invention may be employed in a stack mold configuration in which each of the molding components are seated within respective plates and the plates are longitudinally movable relative to one another during the automated injection molding process. A stack mold of the type described is shown and disclosed in U.S. Pat. No. 4,019,711 which is hereby incorporated by reference; although, the particular mold components and molding method employed in the stack mold configuration as shown in that patent are distinctly different from those of this invention.

Therefore, as a result of this invention, an improved method and mold for injection molding a plastic closure having undercut projections such as threads, lugs, stops or the like is provided having increased simplicity, interchangeability and applicability for industrial injection molding manufacturing applications.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
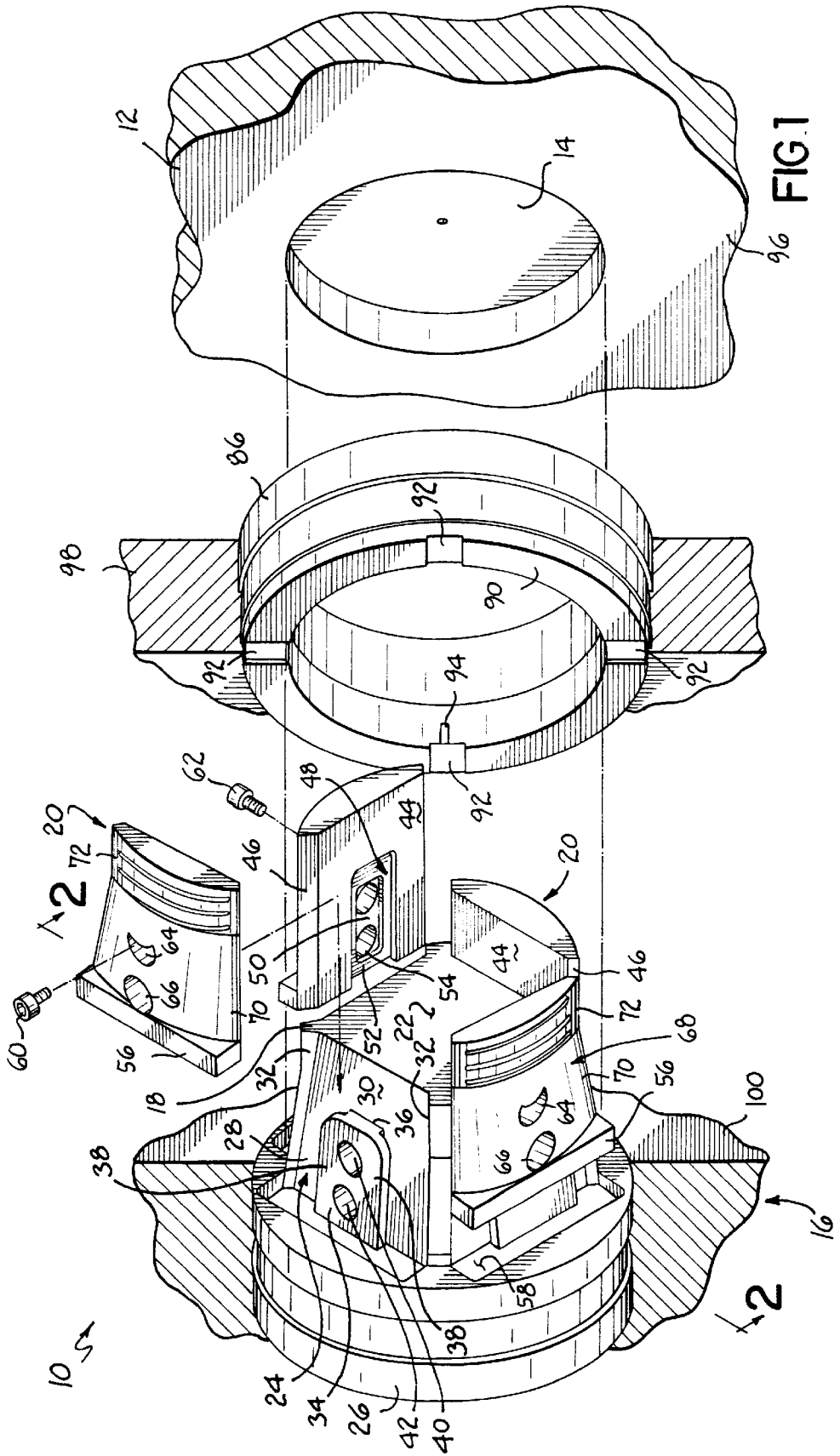
FIG. 1 is an exploded partially disassembled perspective view of the components of an injection molding apparatus for a molded closure according to a first presently preferred embodiment of this invention.

Referring to FIG. 1, a presently preferred embodiment of a molding apparatus 10 according to this invention is shown. The molding apparatus 10 includes an outer mold 12 having a socket 14 formed therein and an inner mold 16 including a mold core 18 and a plurality of slides 20, four of which are shown in FIG. 1, mounted on the core 18 for movement relative to the core 18 in a direction obliquely oriented with respect to a longitudinal axis of the core 18. The core 18 includes a generally planar upper surface 22 and a tapered or sloped body 24 angled obliquely inwardly toward the upper surface 22 from a base 26 of the inner mold 16. Each slide 20 is mounted to the core 18 and seated within a tapered and sloped channel 28 having a generally planar face 30 bounded on each lateral side by a channel sidewall 32. A guide boss 34 projects from the face 30 of the channel 28 and has a generally T-shaped cross-sectional configuration in which a base 36 of the guide 34 is juxtaposed in face-to-face contact with the face 30 of the channel 28 and flanges 38 extend from the base 36 on either side of the guide 34 and are spaced from the face 30 of the channel 28. The guide 34 includes a pair of holes 40, 42 and a screw, pin or other mechanical fastener is inserted through the lowermost hole 42 in the guide 34 to secure the guide 34 to the mold core 18.

A slide 20 is mounted on the mold core 18 in each of the channels 28 and includes a generally planar back face 44 and a pair of sidewalls 46 extending obliquely from the back face 44. The back face 44 and sidewalls 46 of the slide 20 mate with the face 30 and sidewalls 32 of the channel 28 when the slide 20 is mounted on the core 18. The spaced sidewalls 46 of the slide 20 (and the corresponding spaced sidewalls 32 of the channel 28) are non-parallel with respect to each other to minimize friction between the slide 20 and the mold core 18 during movement of the slide 20.

A T-shaped slot 48 being open on a bottom edge of the slide 20 is formed on the back face 44 of the slide 20 and is sized and configured to mate with the guide 34 mounted in the channel 28. A recess 50 is formed in a well 52 of the T-slot 48 on each slide 20. A rim 54 of the recess 50 serves a detent once the slide 20 is mounted in the channel 28 on the mold core 18. The slide 20 is mounted on the mold core 18 by sliding it downwardly so that the upper end of the guide 34 enters the open bottom end of the T-slot 48 and the respective sidewalls 32, 46 and faces 30, 44 of the slide 20 and channel 28 are in face-to-face juxtaposition until a bottom shelf 56 of the slide 20 is positioned within a seat 58 in the base 26 of the inner mold 16.

The guide 34 has upper and lower holes 40, 42 for receiving therein upper and lower screws, pins or other appropriate fasteners 60, 62. The upper and lower holes 40, 42 in the guide 34 are aligned with upper and lower through holes 64, 66 in the slide 20 when the slide 20 is positioned on the mold core 18 with the shelf 56 contained in the seat 58 of the inner mold 16. The lower screw 62 is inserted through the lower through hole 66 in the slide 20 and into the lower hole 42 in the guide 34 to secure the guide 34 to the mold core 18. Preferably, the lower screw 62 is flush or recessed with respect to an outer surface of the guide 34. The upper screw 60 is inserted through the upper through hole 64 in the slide 20 and is seated within the upper hole 40 in the guide 34 so that it projects from the outer surface of the guide 34.

With the slide 20 so mounted on the inner mold 16 and seated for movement within the channel 28, the upper screw 60 serves as a detent in combination with the rim 54 to prevent the slide 20 from sliding off of the mold core 18. Upward movement of the slide 20, as shown in FIG. 1, is limited because the rim 54 in the recess 50 of the T-slot 48 on the slide 20 contacts the head of the uppermost screw 60 projecting from the outer surface of the guide 34 to thereby prevent the slide 20 from sliding off of the mold core 18. As a result of the interaction between the rim 54 and the upper screw 60, the slides 20 are limited to upward travel to the extent shown in the slides 20 attached to the core 18 in FIG. 1.

Figure 2A:
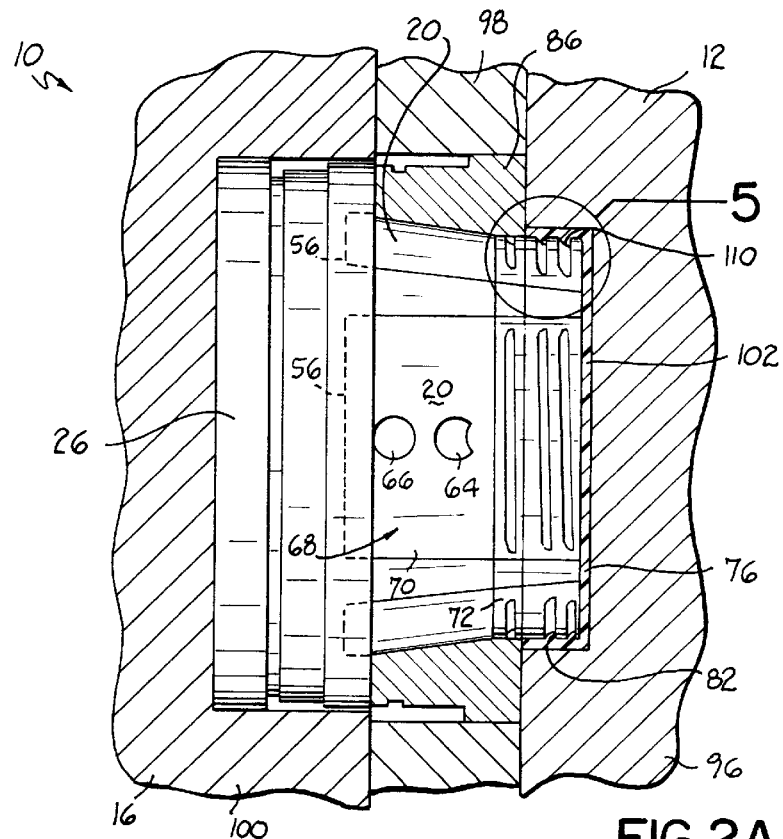
FIG. 2A is a cross-sectional view taken along line 2—2 of FIG. 1 showing the injection molding apparatus of FIG. 1 in a closed configuration.
Figure 2B:
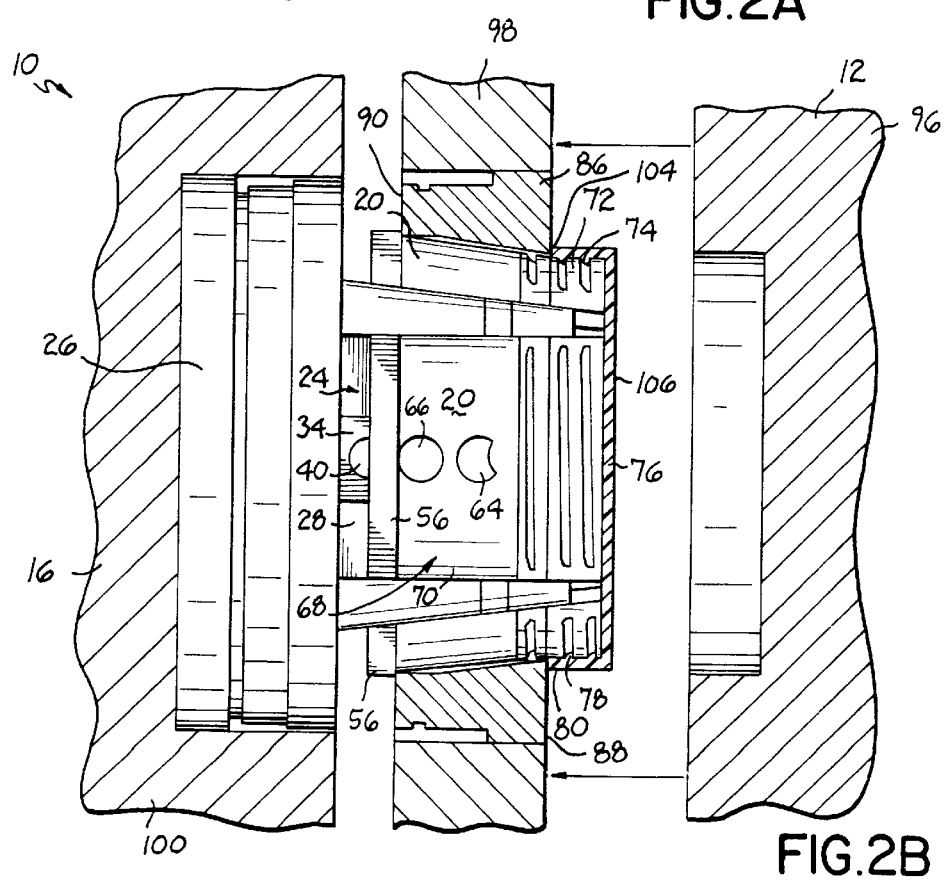
FIG. 2B is a view similar to FIG. 2A with an outer mold being removed from the molded closure and a ring advancing the closure forwardly and the closure advancing slides on an inner mold core obliquely relative to the axis of the core.
Figure 5:
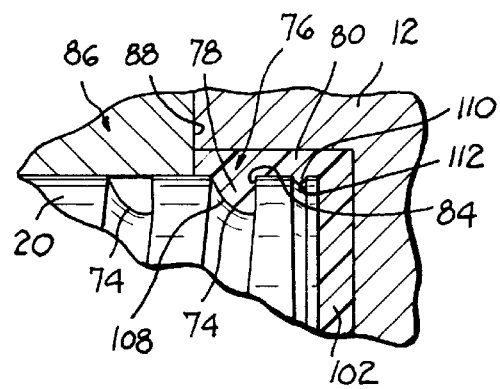
FIG. 5 is an enlarged cross-sectional view of the region 5 of FIG. 2A showing the projections on the skirt of the closure engaging the recesses on the slide of the inner mold.

Each slide 20 in a presently preferred embodiment of the invention has a generally arcuate outer face 68 with a lower tapered section 70 and an upper section 72 having a plurality of recesses 74 formed therein. It will be appreciated by one of ordinary skill in the art that the mold 10 shown in FIG. 1 is for forming a generally round or circular closure 76 although other configurations can be produced with appropriately designed molds 10 according to this invention. The recesses 74 in the upper section 72 of each slide 20 form undercut projections 78 which extend inwardly from a skirt 80 of the closure 76 formed by the mold 10 (FIGS. 2A, 2B and 5). The recesses 74 shown in the slides 20 of FIG. 1 form intermittent or interrupted threads 78 on the closure 76. Preferably, the recesses 74 include an undercut 82 which produces a corresponding undercut 84 on the projections or threads 78 of the closure 76. As used herein, the term "projection" or variations thereof means a thread of any kind, lug, stop, bayonet structure, rim or any other device which extends inwardly from the skirt 80 on the closure 76 and is formed by the recess 74 in the slide 20.

A molding apparatus 10 according to a presently preferred embodiment of this invention also includes a ring 86 which is sized and configured to fit around the slides 20 and mold core 18 and to be positioned between the outer mold 12 and the inner mold 16. The ring 86 includes an upper surface 88 and a lower surface 90 and a plurality, four of which are shown in FIG. 1, of air ducts 92 are formed and spaced approximately 90° with respect to each other on the lower surface 90 of the ring 86. The ducts 92 are in communication with notches 94 on the inner surface of the ring 86 and permit air to escape from the molding apparatus 10 during the injection molding process.

The outer mold 12, inner mold 16, ring 86 and various components of the molding apparatus 10 according to this invention can be contained within plates for use in a stack mold for the industrial production of closures 76 and other molded articles. A stack mold of this type is shown in U.S. Pat. No. 4,019,711 and it will be appreciated by one of ordinary skill in the art that multiple molding systems according to this invention can be contained within a given stack mold for injection molding multiple closures 76 or other devices during a single operation.

Figure 2C:
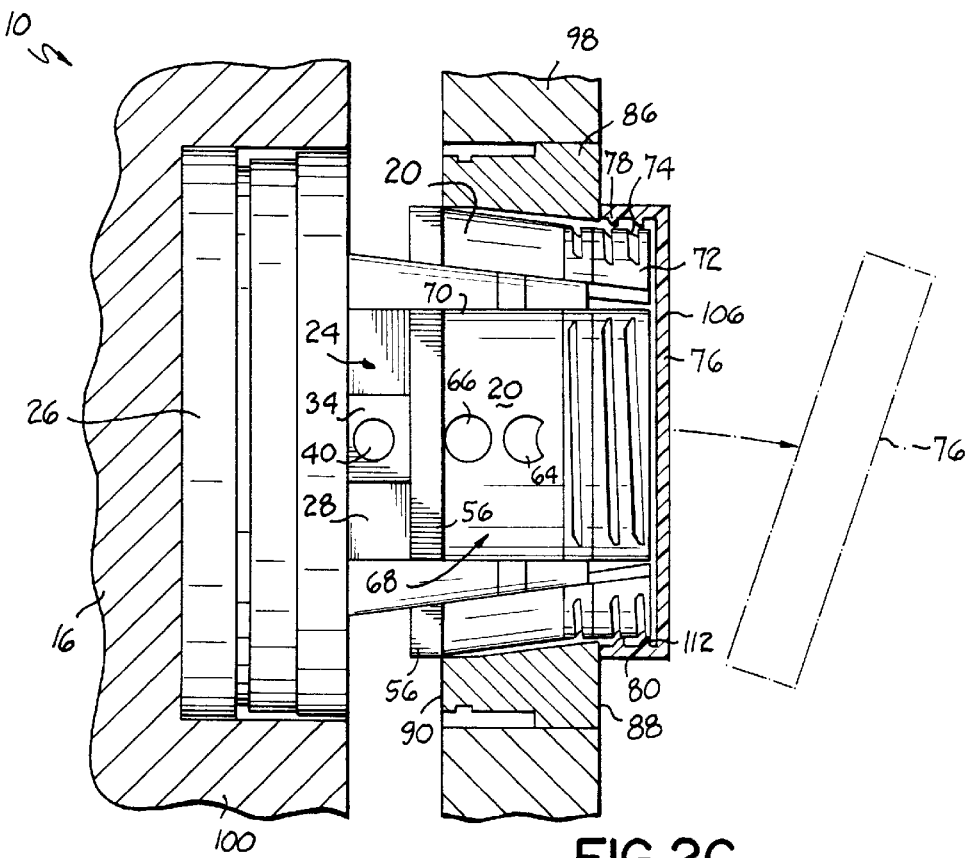
FIG. 2C is a view similar to FIG. 2B with the projections on the skirt of the closure disengaging from recesses on the slides of the inner mold thereby releasing the closure from the inner mold.

A presently preferred method of injection molding a closure 76 according to this invention is shown in FIGS. 2A–2C. Initially, the respective plates 96, 98, 100 are juxtaposed in face-to-face configuration as shown in FIG.

2A to produce a closed configuration of the molding apparatus 10. In the closed configuration, a cavity 102 is formed between the inner mold 16, the outer mold 12 and the ring 86 into which closure material for forming a closure 76 is injected as is readily known in the art. The closure material may be a variety of materials including styrene, polypropylene and any other thermoplastic resin or other appropriate composition. As is readily seen in FIG. 2A, the closure 76 is formed between the outer mold 12, specifically the socket 14 of the outer mold 12, and the mold core 18 and the slides 20 on the mold core 18. The upper surface 88 of the ring 86 is in contact with a terminal edge 104 of the skirt 80 of the closure 76. As shown in FIG. 2B, the molding apparatus 10 converts to an open position when the outer mold 12 is removed from the ring 86 and the inner mold 16 once the closure material has had sufficient time to harden and solidify. The socket 14 in the other mold 12 forms the outer external surface of the closure 76 including the outer surface of the skirt 80 and an upper panel 106 of the closure 76.

The mold 10 continues to open by moving the ring 86 in a direction generally parallel to the longitudinal axis of the mold core 18 and away from the base 26 of the inner mold 16. As the ring 86 moves in this direction, it maintains contact with the lower edge 104 of the skirt 80 of the closure 76 thereby moving the closure 76 with the ring 86. The threads, lugs, rims, or other projections 78 formed on the inner surface of the skirt 80 are seated within the recesses 74 in the slides 20 as shown in FIGS. 2A and 2B. As a result, the movement of the closure 76 in response to the movement of the ring 86 translates the slides 20 obliquely relative to the longitudinal axis of the mold core 18. More specifically, the closure 76 is the mechanism for moving the slides 20 relative to the mold core 18.

The slides 20 are movable axially from and angling radially inwardly towards the longitudinal axis of the mold core 18 as shown in FIGS. 1–2C from the closed position of the mold 10 to the open position of the mold 10 as shown in FIG. 2C. As the slides 20 move upwardly and angle inwardly in response to the movement of the closure 76, the recesses 74 in the slides 20 move in two vectors. The recesses 74 are moved in a first direction generally parallel to the longitudinal axis of the mold core 18 forcing the slides 20 to the right as shown in FIGS. 2A and 2B. The slides 20 and the recesses 74 also move in an inwardly radial vector toward the longitudinal axis thereby unseating the threads or other projections 78 on the closure 76 from the recesses 74 such that the closure 76 can be released from the slides 20 as shown in FIG. 2C. Thus, the present invention provides an effective mechanism for first injection molding a closure 76 having threads, lugs, rims or other projections 78 extending radially inward from the skirt 80 and removing the closure 76 from the inner mold 16 without deformation of the projections 78.

Known collapsing molds often include complicated mechanisms, springs or other biasing systems for moving the slides relative to the mold core. However, the present invention avoids the need for any such complicated mechanisms and the maintenance and reliability problems associated therewith. The movement of the slides 20 is independent from the movement of the ring 86. In other words, the ring 86 is free to translate relative to the slides 20 in the forward direction in the absence of the closure 76 seated on the inner mold 16. The mechanism for translating the slides 20 towards the open position shown in FIG. 2C is the engagement of the projections 78 on the skirt 80 of the closure 76 and the recesses 74 on the slides 20.

Advantageously, the molding apparatus 10 and method according to this invention enables the formation of undercut projections 78 on the closure 76 without damage to those projections 78 during the release of the closure 76 from the mold 10. Specifically, as shown in FIG. 5, the intermittent threads 78 include an undercut surface 84 and an arcuate or rounded surface 108 in combination therewith. Preferably, the undercut 84 forms an angle with respect to the skirt 80 from between approximately 82° and 90°.

Furthermore, a retaining rim 110 also having an undercut surface 112 may be formed by the recesses 74 and slides 20 on the mold 10 according to this invention. Advantageously, the retaining rim 110 is one specific projection 78 and is positioned adjacent the panel 106 of the closure 76 and spaced therefrom. The retaining rim 110 may be interrupted or intermittent similar to the threads 78 formed on the skirt 80. The retaining rim 110 is used to secure a sealing disk (not shown) in the closure 76 in generally face-to-face contact with the lower surface of the panel 106 as is readily known in the art. Advantageously, the retaining rim 110 secures the disk to the closure 76 in a press-fit or friction-fit without the need for adhesive, glue or the like.

Figure 3A:
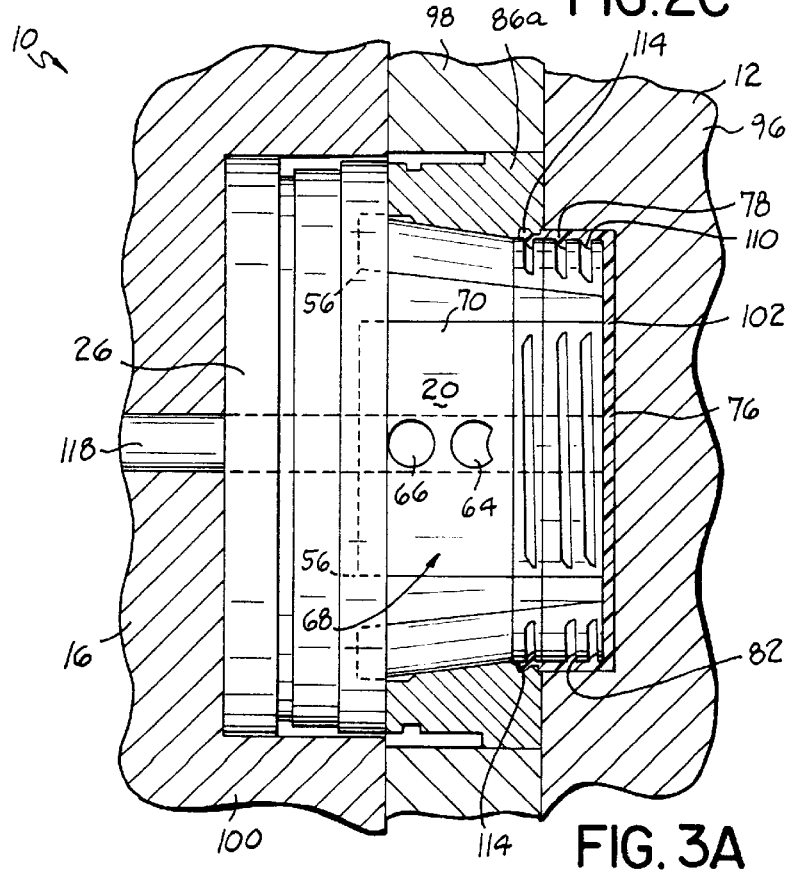
FIG. 3A is a view similar to FIG. 2A of an alternative embodiment of the molding apparatus of this invention for forming a closure with a tamper evident band.
Figure 3B:
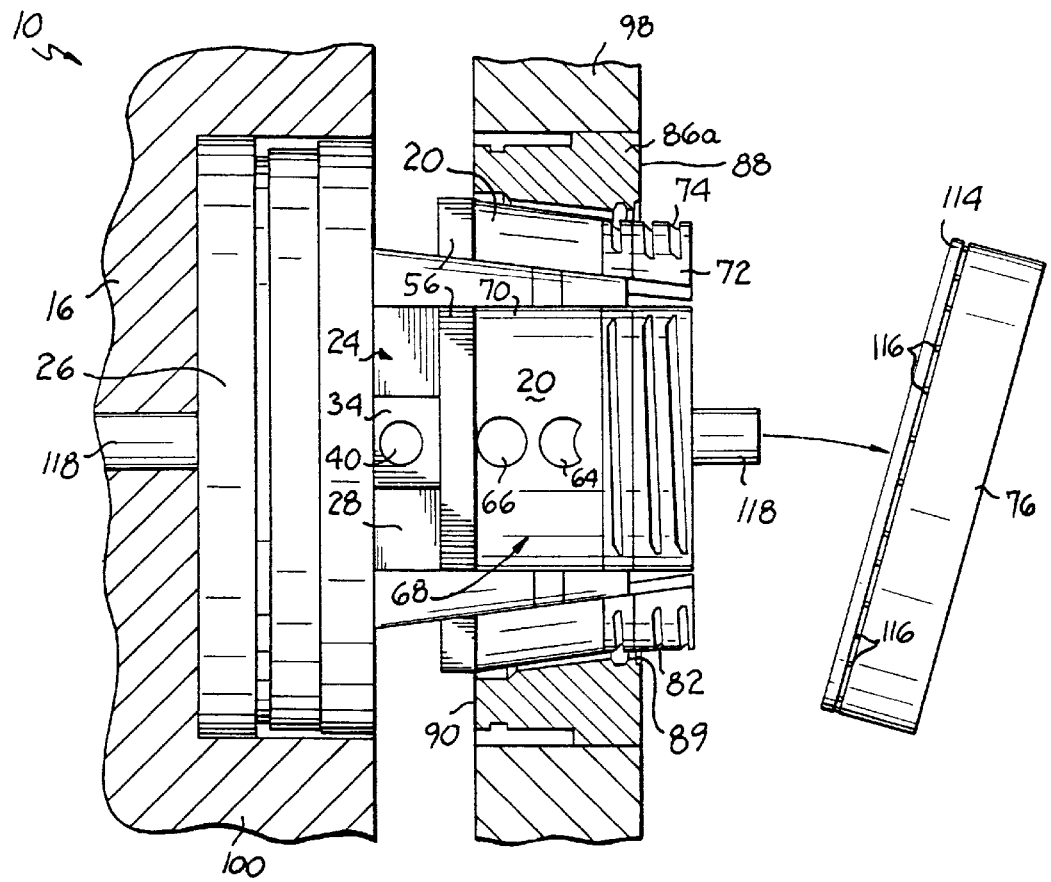
FIG. 3B is a view of the molding apparatus of FIG. 3A with the closure being released from the inner mold by a plunger extending from the mold core.
Figure 4:
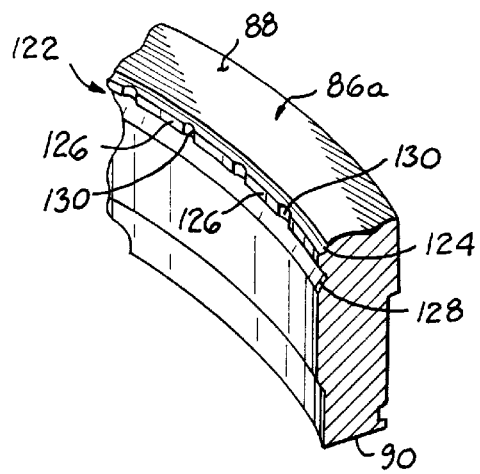
FIG. 4 is an enlarged partial view of the ring of the molding apparatus of FIGS. 3A and 3B.

A second presently preferred embodiment of the molding apparatus 10 and method for injection molding a closure 76 according to this invention is shown in FIGS. 3A, 3B and 4. Elements of the second presently preferred embodiment similar to corresponding elements in the first presently preferred embodiment are identified with the same reference numerals. The second presently preferred embodiment of this invention is particularly adapted for injection molding a closure 76 having a tamper evident band 114 attached via frangible spaced bridges 116 to the terminal lower edge 104 of the skirt 80 (FIG. 3B).

As shown in FIGS. 3A and 3B, the molding apparatus 10 according to this preferred embodiment of the invention further includes a plunger 118 axially extendable from the inner mold 16 to project from the upper face 22 of the mold core 18. The plunger 118 is generally aligned with the longitudinal axis of the inner mold 16. After the closure material is injected into the cavity 102 formed between the inner mold 16, the outer mold 12 and the ring 86a (FIG. 3A) and the outer mold 12 is removed from the closure 76, the ring 86a is in contact with the closure 16 and translates relative to the mold core 18. The ring 86a includes an intaglio pattern 122 proximate the upper and inner faces thereof as shown particularly in FIG. 4. The intaglio pattern 122 includes an upper groove 124 adjacent the upper surface 88a of the ring 86a, a rib 126 and a lower groove 128. The intaglio pattern 122 provides a relief for the formation of the tamper evident band 114 and frangible bridges 116 on the closure 76. Specifically, the lower groove 128 forms the band 114 and a plurality of spaced flutes 130 connecting the upper groove 124 to the lower groove 128 form the frangible bridges 116 of the closure 76 according to this embodiment of the invention. Therefore, the ring 86a of this embodiment of the invention forms the tamper evident band 114 and engages the closure 76 as the ring 86a is translated away from the base 26 of the inner mold 16 thereby advancing the closure 76 and the slides 20 in contact with the closure 76 as previously described with reference to FIGS. 2A–2C.

After the ring 86a and associated plate 98 are moved away from the inner mold base 26 and associated plate 100 so that the slides 20 are translated inwardly toward the longitudinal axis of the mold core 18 to disengage the recesses 74 from the projections 78, the plunger 118 is extended to contact the panel 106 of the closure 76 and disengage the tamper evident band 114 from the ring 86a and thereby release the closure 76 from the mold 10 as shown in FIG. 3B.

Another important feature of the presently preferred embodiment of the ring 86a is a chamfer 89 extending around the ring 86a proximate the upper surface 88a thereof. The chamfer 89 holds the closure 76 in the center of the ring 86a for alignment in the molding apparatus 10. The centering of the closure 76 relative to the ring 86a with the chamfer 89 has proven to be an important feature for the present invention.

Advantageously, the tamper evident band forming ring 86a of the second presently preferred embodiment can be easily and quickly replaced as required with the ring 86 of the first presently preferred embodiment while the inner and outer molds 16, 12 remain unchanged. As such, the production capability for selectively manufacturing closures 76 with or without tamper evident bands 114 is much more efficient according to this invention. The plunger 118 or a plurality of plungers may be included with the tamper evident band forming ring or the ring 86 shown in FIGS. 2A–2C. Additionally, the plunger 118 or plungers may be used as the mechanism for advancing the closure 76 in addition to or instead of the movement of the ring 86 or 86a. Specifically, extension of the plunger 118 to contact the panel 106 of the closure 76 and thereby move the closure 76 away from the mold core 18 results in the movement of the slides 20 toward the longitudinal axis of the mold core 18 and ultimately disengages the recesses 74 on the slides 20 from the projections 78 on the skirt 80. As such, the movement of the plunger 118 alone or in combination with the movement of the ring 86 or 86a can be the mechanism for moving the slides 20.

After the closure 76 has been released from the inner mold 16 and the slides 20, the components of the molding apparatus 10 according to this invention are then reassembled into the closed configuration. As the ring 86 or 86a is moved towards the inner mold base 26, the lower surface 90 of the ring 86 or 86a contacts the upper surface of the shelf 56 on each slide 20 thereby translating the slide 20 toward the closed configuration of the mold 10.

From the above disclosure of the general principles of the present invention and the preceding detailed description of a preferred embodiment, those skilled in the art will readily comprehend the various modifications to which this invention is susceptible. For example, the presently preferred embodiments described in detail herein are directed to a closure or cap, but the invention is readily applicable to a jar, container or the like with internal threads for use with a closure having external threads. As such, the term "closure" and variations thereof as used herein refers to caps, containers, jars or closures as readily understood in the art. Therefore, we desire to be limited only by the scope of the following claims and equivalents thereof.

We claim:

1. A method of molding a closure having a skirt extending downwardly from a panel and at least one projection extending inwardly from the skirt, the method comprising:

injecting closure material into a mold cavity formed by an outer mold and an inner mold, the inner mold having a core and at least one slide with a recess on an outer face thereof for forming the projection on the skirt, the slide being mounted on the core for movement relative to the core in a direction obliquely oriented with respect to a longitudinal axis of the core;

removing the outer mold from the closure seated on the inner mold;

moving the closure away from the core; and moving the slide inwardly toward the longitudinal axis of the core using the movement of the closure until the projection on the closure disengages from the recess in the slide thereby releasing the closure from the inner mold.

2. The method of claim 1 wherein the moving of the closure away from the core is accomplished by moving a ring surrounding the core and the slide in a direction parallel to the longitudinal axis of the core, the ring being in communication with the closure so that the movement of the ring moves the closure and the movement of the closure moves the slide.

3. The method of claim 2 wherein the movement of the slide is independent from the movement of the ring.

4. The method of claim 2 wherein the movement of the slide to release the closure from the inner mold is a result of the interaction between the recess and the projection on the closure.

5. The method of claim 2 further comprising:

limiting the movement of the slide relative to the core to inhibit the slide from disengaging from the core.

6. The method of claim 2 further comprising:

extending a plunger from the core and contacting the closure to assist in releasing the closure from the ring.

7. The method of claim 2 further comprising:

forming an undercut surface on the projection.

8. The method of claim 2 wherein an outer surface of the ring contacts the closure at a terminal edge of the skirt.

9. The method of claim 1 further comprising:

forming a tamper evident band on the skirt of the closure.

10. The method of claim 9 wherein the tamper evident band is formed in part by a ring and the ring contacts the closure on the tamper evident band and the ring moves away from the core which moves the closure, the movement of the closure moving the slide to release the closure from the core.

11. The method of claim 2 further comprising:

contacting the slide with the ring after the closure has been released from the inner mold; and moving the ring parallel to the longitudinal axis of the core and toward the core to thereby reposition the slide on the core for subsequent injection molding operations.

12. The method of claim 1 wherein the moving of the closure away from the core is accomplished by contacting the closure with a plunger being selectively extensible from the inner mold and extending the plunger from the inner mold and thereby moving the closure away from the core.

13. A method of injection molding a closure having a skirt extending downwardly from a panel and a plurality of interrupted projections extending inwardly from the skirt, the method comprising:

injecting closure material into a mold cavity formed by an outer mold and an inner mold, the inner mold having a core and a plurality of spaced slides each having at least one recess on an outer face thereof for forming the projections on the skirt, the slides being mounted on the core for movement relative to the core in a direction obliquely oriented with respect to a longitudinal axis of the core, a ring surrounding a portion of the core;

providing an undercut surface in the recesses to form corresponding undercut surfaces on the projections;

removing the outer mold from the closure seated on the inner mold;

contacting the closure with the ring;

moving the ring parallel to the longitudinal axis of the core and away from the core and thereby removing the closure from the core; and moving the slides inwardly toward the longitudinal axis of the core via the movement of the closure until the projections on the closure disengage from the recesses in the slides thereby releasing the closure from the inner mold, wherein the movement of the slides to release the closure from the inner mold is a result of the interaction between the recesses and the projections on the closure.

14. The method of claim 13 further comprising:

forming a tamper evident band on the skirt of the closure.

15. The method of claim 14 wherein the ring is a tamper evident band forming ring having an intaglio pattern thereon which forms the tamper evident band on the closure.

16. The method of claim 14 further comprising:

extending a plunger from the core and contacting the closure to assist in releasing the closure from the inner mold.

17. The method of claim 13 further comprising:

contacting the slides with the ring after the closure has been released from the inner mold; and moving the ring parallel to the longitudinal axis of the core and toward the core to thereby reposition the slides on the core for subsequent injection molding operations.

* * * * *